United States Patent [19]

Yagasaki

[11] Patent Number: 4,651,845

[45] Date of Patent: Mar. 24, 1987

[54] POWER-DRIVEN STAND DEVICE FOR MOTORCYCLES

[75] Inventor: Akio Yagasaki, Tokyo, Japan

[73] Assignee: Honda Giken Kogyo Kabushiki Kaisha, Tokyo, Japan

[21] Appl. No.: 794,114

[22] Filed: Nov. 1, 1985

[30] Foreign Application Priority Data

Nov. 1, 1984 [JP] Japan .................. 59-230628
Nov. 1, 1984 [JP] Japan .................. 59-230629

[51] Int. Cl.⁴ .............................................. B62H 1/02
[52] U.S. Cl. .................................... 180/219; 280/301
[58] Field of Search .......... 280/293, 301, 303, 289 G, 280/289 R; 180/219

[56] References Cited

U.S. PATENT DOCUMENTS 3,980,150  7/1976  Gigli ................................ 280/293
4,223,906  7/1980  Gratza .............................. 180/219
4,241,933  12/1980  Gratzi .............................. 180/219

Primary Examiner—John J. Love
Assistant Examiner—Donn McGiehan
Attorney, Agent, or Firm—Irving M. Weiner; Joseph P. Carrier; Pamela S. Burt

[57] ABSTRACT

A power-driven stand device in a motorcycle includes a frame, a stand angularly movably mounted on the frame, the stand being manually movable in a relatively light load range thereof, a drive source for moving the stand in a relatively heavy load range thereof, a control member for remotely controlling the stand, a first detector associated with the control member for detecting the control member in a prescribed position, a second detector associated with the stand for detecting the stand substantially in contact with the ground, and a control unit for controlling the drive source to operate the stand in response to combinations of outputs of the first and second detectors.

4 Claims, 16 Drawing Figures

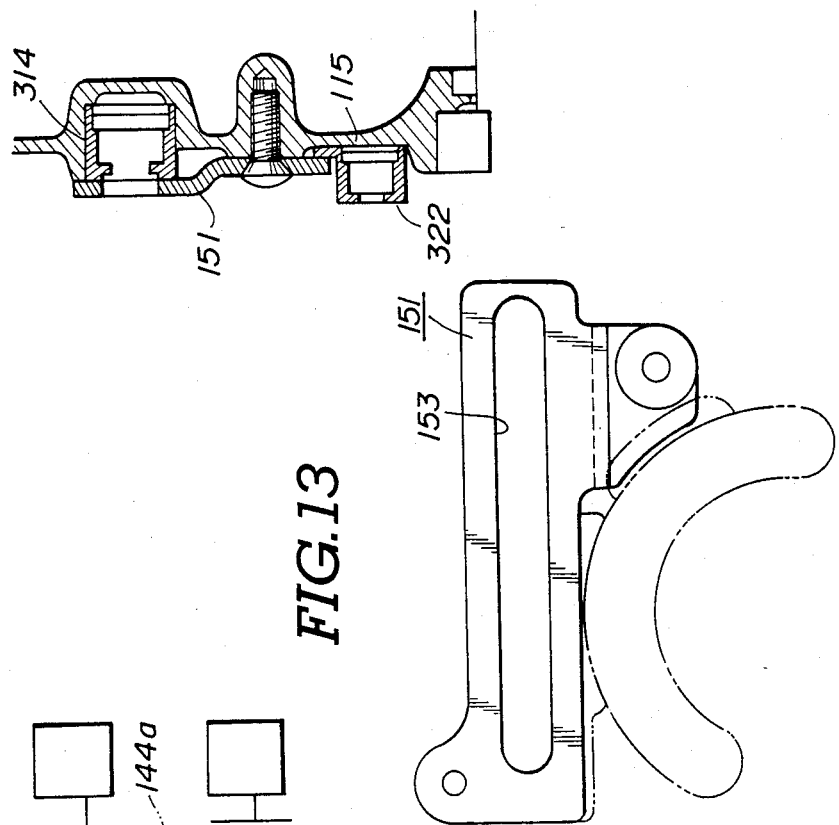
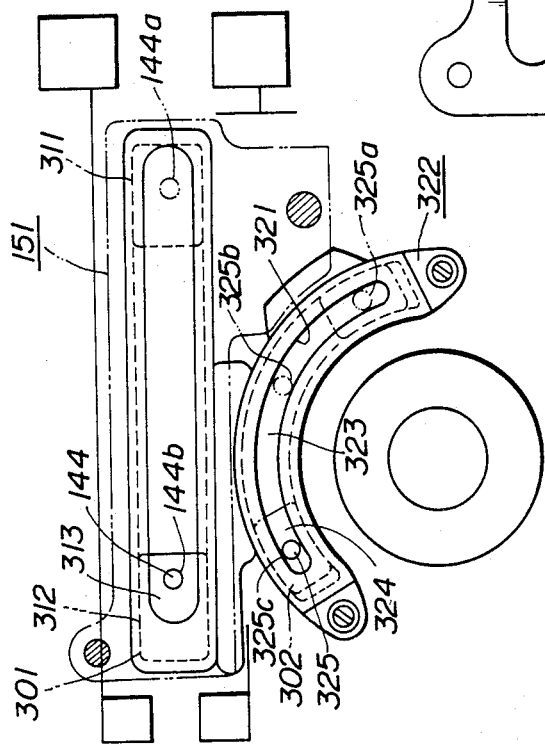

FIG.15

| | | | | | | | | | |
|---|---|---|---|---|---|---|---|---|---|
| SWITCH (301) | ON | OFF | OFF | ON | ON | OFF | OFF | ON | ON |
| SWITCH (302) | OFF | ON | ON | ON | ON | ON | ON | OFF | OFF |
| SWITCH (303) | OFF | OFF | ON | ON | ON | OFF | ON | OFF | OFF |
| MOTOR (114) | STOP | STOP | NORMAL | NORMAL | STOP | REVERSE | NORMAL | REVERSE | STOP |
| | STOPPED | MANUAL | MOTOR-DRIVEN | CAN-CELLED | FULLY LIFTED | MOTOR-DRIVEN | CAN-CELLED | MOTOR-DRIVEN | FULLY LOWERED |
| | | ← LIFTED → | | | | ← LOWERED → | | | |

POWER-DRIVEN STAND DEVICE FOR MOTORCYCLES

BACKGROUND OF THE INVENTION

1. Field of the Invention

The present invention relates to a power-driven stand device for use on motorcycles.

2. Description of Related Art

One known motocycle stand device is disclosed in Japanese Patent Publication No. 35-10415, for example. The disclosed motorcycle stand device has a controller for remotely controlling the stand which is to be lifted and lowered. Since the stand is manually operated to move in its entire stroke of vertical travel, the operator is required to exert a large amount of manual force especially when the motorcycle is heavy.

Japanese Patent Publication No. 37-12158 shows a motor-driven stand device for automatically raising and lowering a stand. The disclosed stand device is however disadvantageous in that it takes a long period of time for the stand to be lifted and lowered since it is operated by the motor at all times, even though the stand could be moved from the lifted or stored position to the lowered or standing position in contact with the ground with a relatively small force in a short interval of time.

SUMMARY OF THE INVENTION

It is an object of the present invention to provide a power-driven stand device for motorcycles which includes a simple control means having a control lever operable to effect switching between standing and storing movements of a stand.

According to the present invention, there is provided a power-driven stand device in a motorcycle, including a frame, a stand angularly movably mounted on the frame, the stand being manually movable in a relatively light load range thereof, a drive source for moving the stand in a relatively heavy load range thereof, a control member for remotely controlling the stand, first detecting means associated with the control member for detecting the control member in a prescribed position, second detecting means associated with the stand for detecting the stand substantially in contact with the ground, and control means for controlling the drive source to operate the stand in response to combinations of outputs of the first and second detecting means.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 11 is a side elevational view of switches incorporated in the power unit.

FIG. 12 is a cross-sectional view of the switches.

FIG. 13 is a side elevational view of a guide member.

FIG. 15 is a diagram showing the states of operation of the switches.

DETAILED DESCRIPTION OF THE PREFERRED EMBODIMENTS

Figure 1:
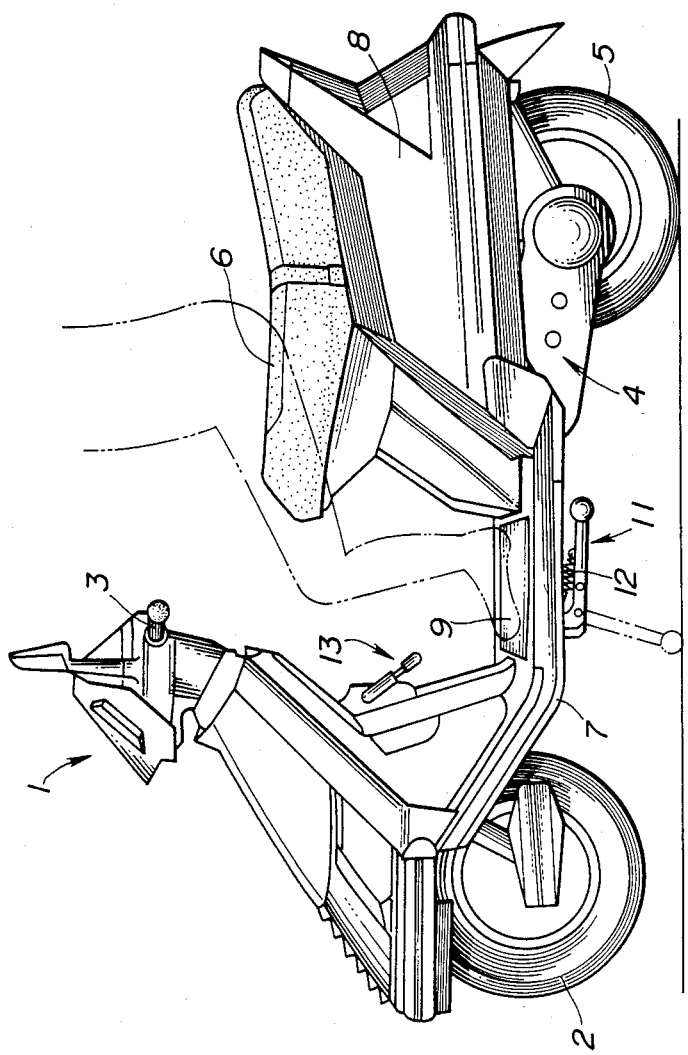
FIG. 1 is a side elevational view of a motorcycle incorporating a power-driven stand device according to an embodiment of the present invention.

As shown in FIG. 1, a motorcycle 1 in which a power-driven stand of the invention is incorporated has a front wheel 2, a handlebar 3, a drive assembly 4 comprising an engine and a transmission case, a rear wheel 5, and a rider's seat 6. The motorcycle 1 also has a frame 7 covered with a cover 8, and a stand 11 supported on the frame 7 below a footrest floor 9, the stand 11 being normally urged by a return spring 12 to swing upwardly into a stored position.

The stand 11 can be angularly moved, by a control lever 13 pivotally mounted on the frame 7, upwardly and forwardly of the floor 9, so that the stand 11 can be manually moved in a light-load range and can be driven by a power unit, such as a motor, in a heavy-load range subsequent to contact of the stand 11 with the ground.

Figure 2:
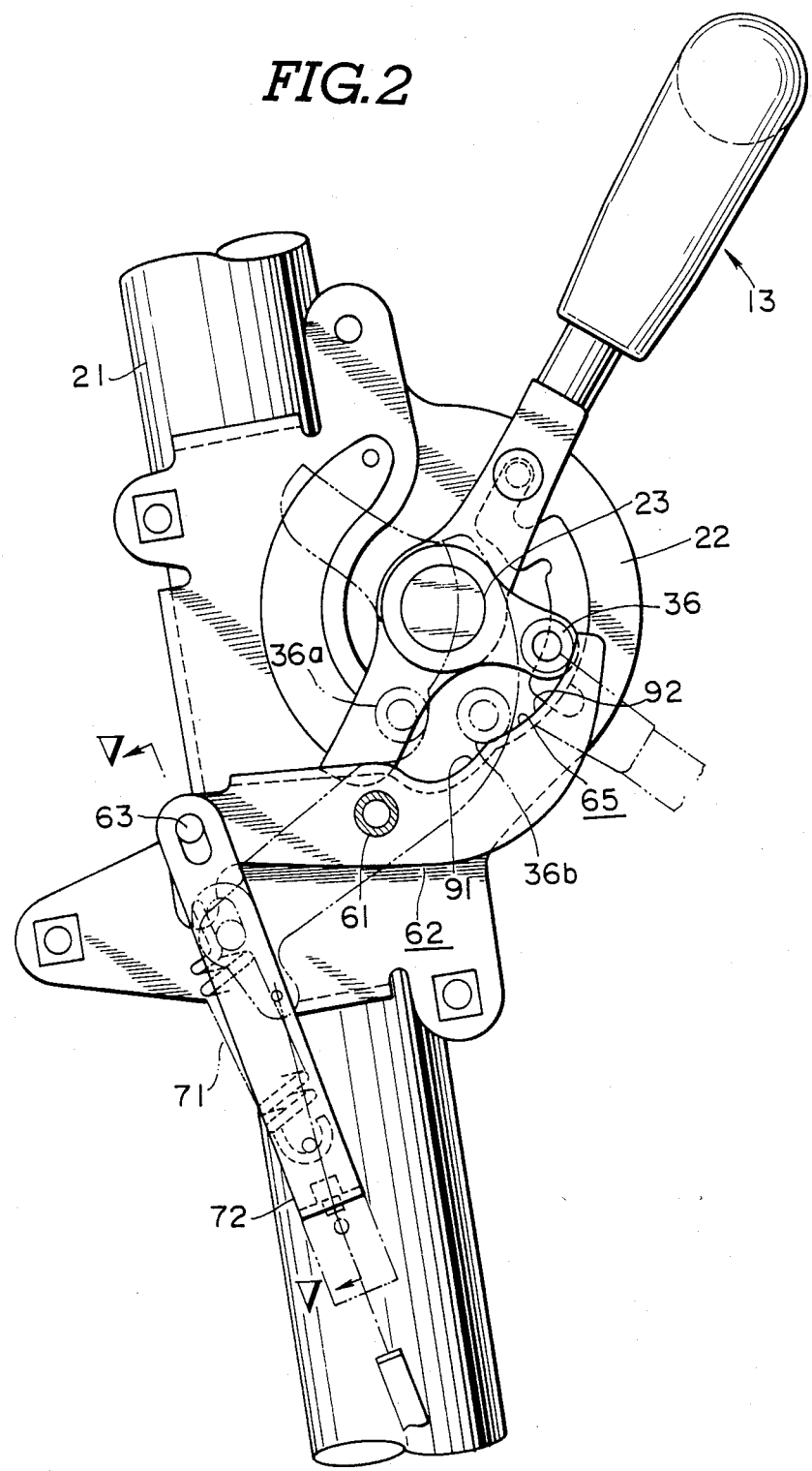
FIG. 2 is a side elevational view of a control lever and associated components.
Figure 3:
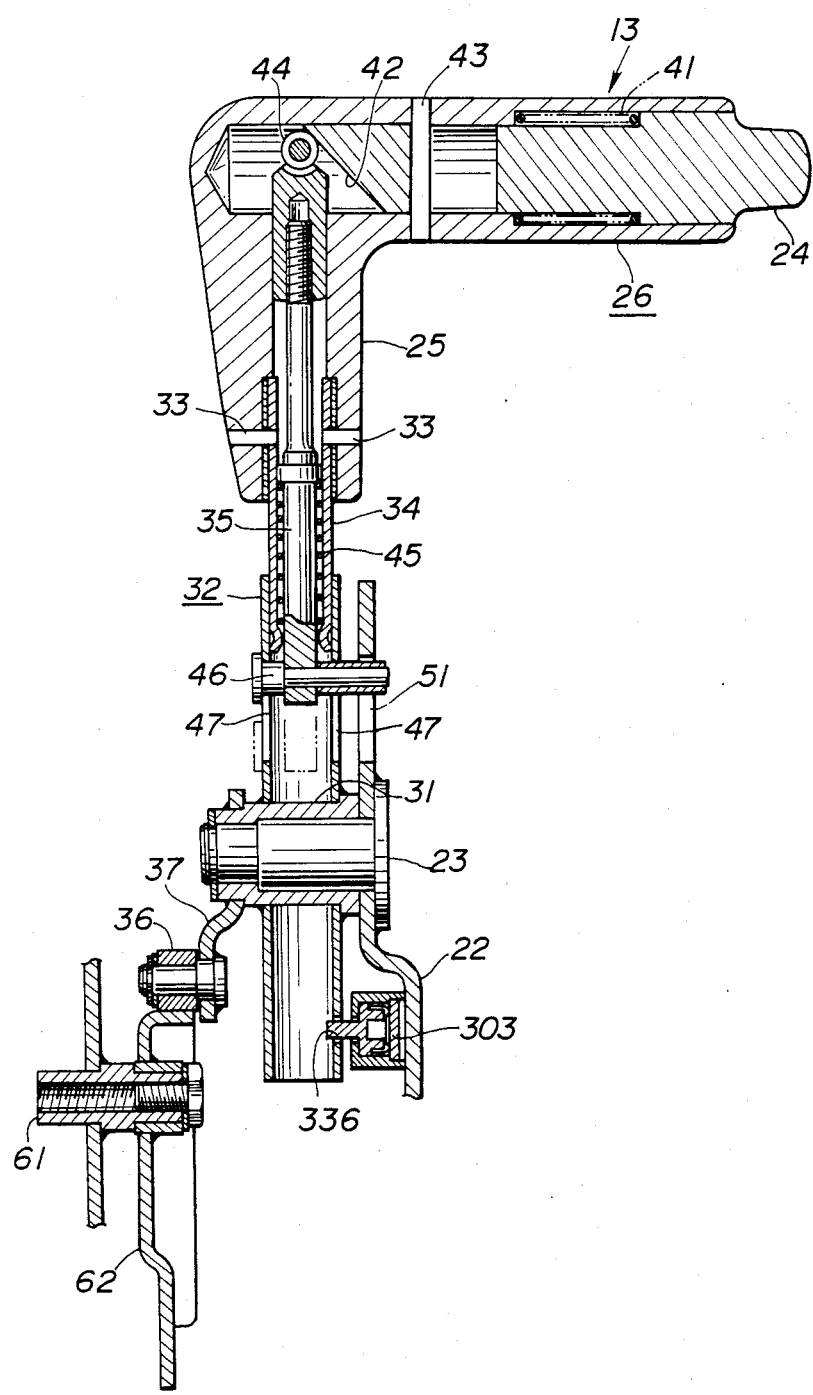
FIG. 3 is a cross-sectional view of the control lever and associated components.

As illustrated in FIGS. 2 and 3, the control lever 13 is vertically angularly movably supported by a pivot shaft 23 on a bracket 22 attached to the rear side of a down tube 21 on its intermediate portion.

The control lever 13 has a grip 26 having a bent portion 25 and a lock button 24 slidably fitted therein, a proximal portion 32 rotatably mounted on the pivot shaft 23 by a collar 31, and an intermediate tube 34 having one end coupled to the bent portion 25 by spring pins 33 and the opposite end fitted in the proximal portion 32. A lock lever 35 is slidably fitted in the bent portion 25, the intermediate sleeve 34, and the proximal portion 32. An arm 37 having a roller 36 on its distal end is fixed to the collar 31.

The lock button 24 is normally urged by a spring 41 to have its one end project from the grip 26. The lock button 24 has a cam surface 42 on its opposite end. The stroke of movement of the lock button 24 is limited by a spring pin 43 extending transversely through the grip 26 and the lock button 24. The lock button 24 is also prevented by the spring pin 43 from rotating in the grip 26.

A roller 44 held against the cam surface 42 is mounted on the upper end (FIG. 3) of the lock bar 35, which is normally urged by a spring 45 to move upwardly toward the roller 44 or the cam surface 42. A lock pin 46 is attached to the lower end of the lock bar 35 and extends in a slot 47 defined in the proximal portion 32.

Figure 4:
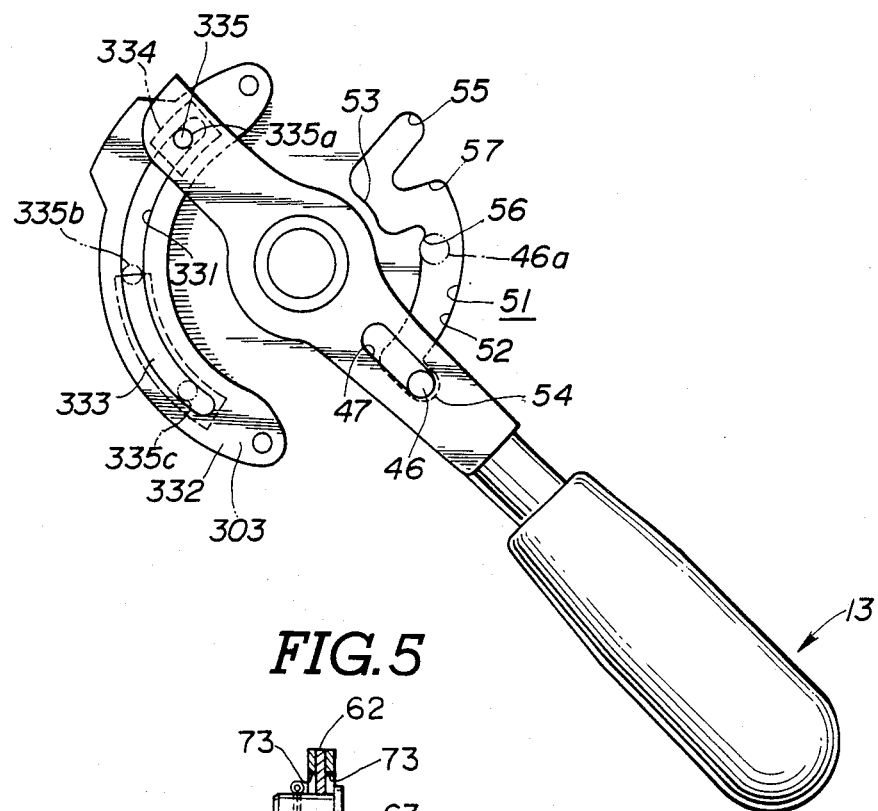
FIG. 4 is a side elevational view of the control lever, a lock pin, and a switch.

The bracket 22 has a cam groove 51 defined in a lower portion thereof, the lock pin 46 being disposed in the cam groove 51 for guided movement therealong. As shown in FIG. 4, the cam groove 51 has an arcuate portion 52 of a larger radius of curvature, and another arcuate portion 53 of a smaller radius of curvature. The cam groove 51 also has engaging groove portions 54, 55 extending radially outwardly from the outer ends of the arcuate portions 52, 53, respectively. Between the arcuate portions 52, 53 there are positioned a projection 56 extending radially outwardly from the radially inner groove surface and a projection 57 extending radially inwardly from the radially outer groove surface. In FIG. 4, the control lever 13 is positioned to hold the stand 11 in the stored position, and the lock pin 46 is held in the engaging groove portion 54 to prevent the control lever 13 from being angularly moved from the position of FIG. 4. To angularly move the control lever 13 upwardly, the lock button 24 is pushed in to cause the cam surface 42 to depress the roller 44 and the lock bar 35 until the lock pin 46 is moved out of the engaging groove portion 54 into the arcuate portion 52. Now, the control lever 13 can be swung. When the control lever 13 is turned upwardly with the lock button 24 pushed in, the lock pin 46 is brought into engagement with the projection 56 as indicated at 46a in FIG. 4, thereby arresting further upward movement of the control lever 13. When the control lever 13 is turned upwardly with the lock button 24 released, the lock pin 46 is caused to engage the projection 57 whereupon the control lever 13 is prevented from continued upward movement. Therefore, the projections 56, 57 serve to temporarily stop the control lever 13 when it is to be angularly moved to its uppermost position. For moving the control lever 13 to the uppermost position, the lock button 24 is operated to displace the lock pin 46 into the arcuate portion 53, and then the control lever 13 is slightly lifted while the lock putton 24 is pushed, followed by releasing the lock button 24. The lock pin 46 is now moved into the engaging groove portion 55 to keep the control lever 13 in the uppermost position.

Figure 5:
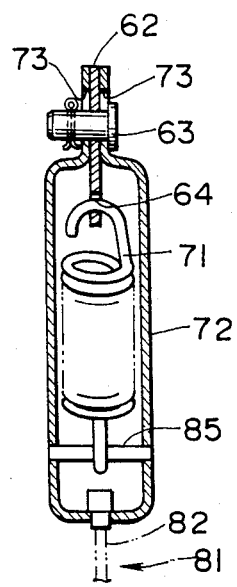
FIG. 5 is a cross-sectional view taken along line V—V of FIG. 2.

A link arm 62 is rotatably mounted on the lower portion of the bracket 22 by means of a pivot shaft 61. As shown in FIG. 5, a pin 63 is attached to one end of the link arm 62, which has a hole 64 defined therein. The link arm 62 has on its other end a cam surface 65 for guiding the roller 36. A cancel spring 71 has one end inserted in the hole 64 and is housed in a casing 72 having a slot 73 defined in one end thereof for receiving the pin 63. The other end of the casing 72 is coupled to an inner member 82 of a cable 81. The other end of the cancel sping 71 engages a spring pin 85 disposed in the casing 72 and located close to the other end thereof.

The cam surface 65 of the link arm 62 has a concave operative surface 91 and an arcuate surface 92 having its center of curvature aligned with the center of the pivot shaft 23. When the stand 11 is in the stored position, the roller 36 is located at 36a in FIG. 2 and is held in engagement with the bottom of the operative surface 91. As the control lever 13 is turned upwardly, the link arm 62 is turned to lift the cable 81 due to engagement between the roller 36 and the operative surface 91. After the roller 36 has reached the upper end of the operative surface 91, the link arm 62 is not angularly moved due to engagement between the roller 36 and the arcuate surface 91 even if the control lever 13 is lifted further.

Figure 6:
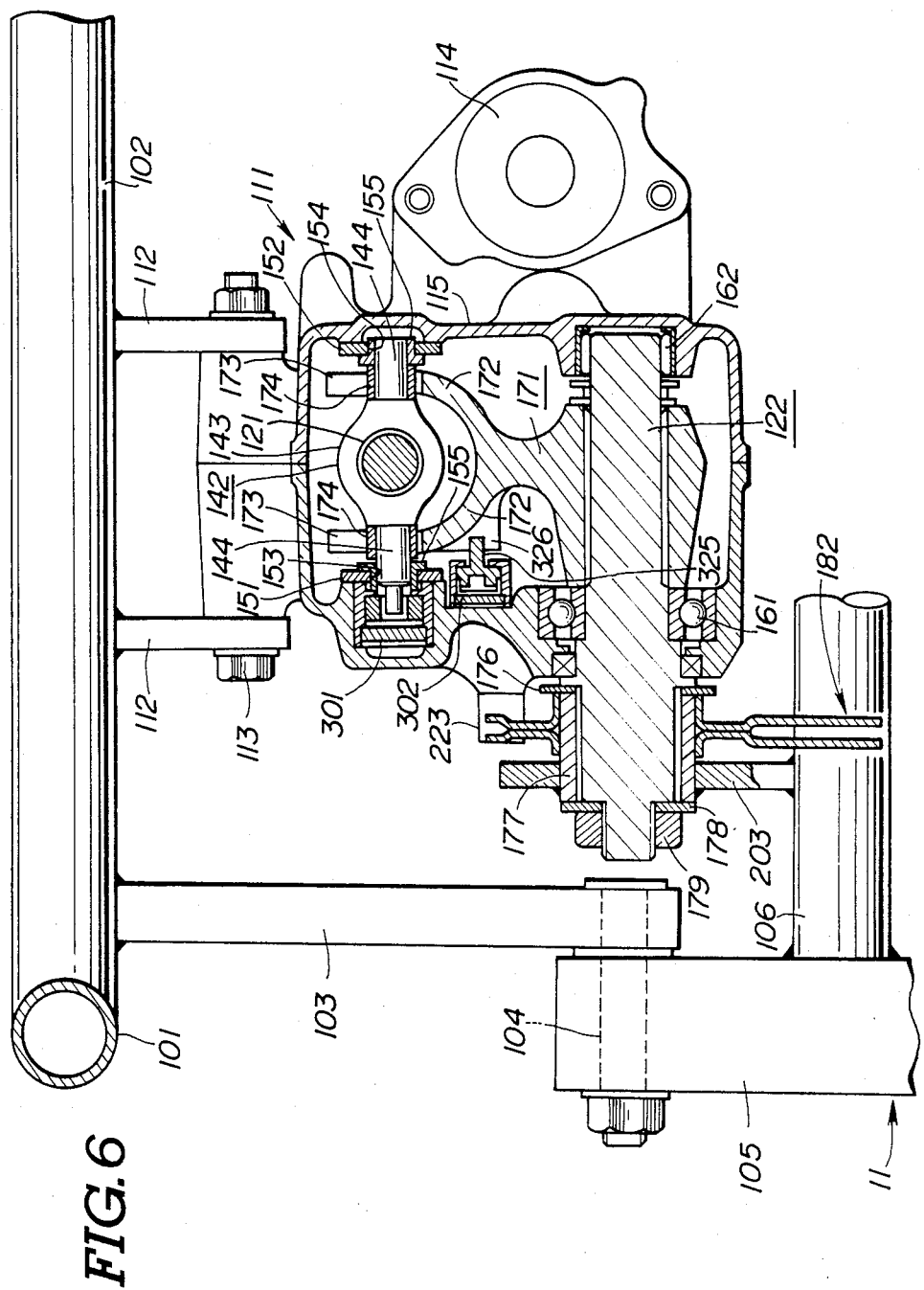
FIG. 6 is a horizontal cross-sectional view of a power unit.

As shown in FIG. 6, the stand 11 is disposed below a cross member 102 interconnecting transversely spaced down frames 101 (one shown in FIG. 6) positioned beneath the floor 9, the stand 11 being rotatably connected to the cross member 102 by a bracket 103 and a pivot shaft 104. The stand 11 includes a pair of laterally spaced members 105 (one shown in FIG. 6) interconnected by a cross bar 106. A power unit 111 for operating the stand 11 is disposed below the cross member 102 and is attached thereto by a pair of brackets 112 and a bolt 113, the power unit 111 having a motor 114.

The power unit 111 has a case 115 accommodating therein a screw shaft 121 extending longitudinally of the motorcycle 1 and an output shaft 122 extending transversely of the motorcycle 1. The output shaft 122 has its axis aligned with the axis of the pivot shaft 104.

Figure 7:
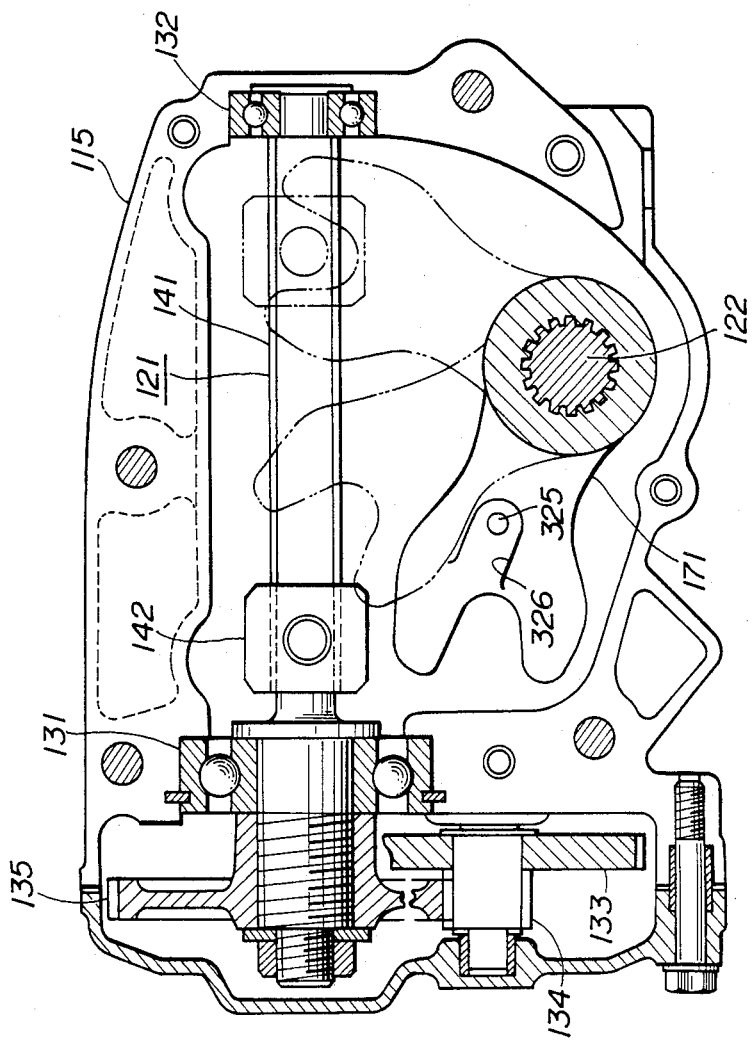
FIG. 7 is a vertical cross-sectional view of the power unit.

As illustrated in FIG. 7, the screw shaft 121 is rotatably supported in the case 115 by a pair of bearings 131, 132 and is operatively coupled to the motor 114 via gears 133, 134, 135 for being rotated thereby.

The screw shaft 121 includes a trapezoidal-thread portion 141 over which a slide piece 142 is threaded. The slide piece 142 includes a cylindrical portion 143 threaded (FIG. 6) over the trapezoidal-thread portion 141 and a pair arms of 144 extending from the cylindrical portion 143 away from each other. The arms 144 are slidably fitted through sliders 155 in slide grooves 153, 154, respectively, defined in guide members 151, 152 attached to the inner surface of the case 115. Therefore, when the screw shaft 121 is rotated about its own axis by the motor 114, the slide piece 142 is moved longitudinally on and along the screw shaft 121.

The output shaft 122 is rotatably supported in the case 115 by a pair of bearings 161, 162 and supports thereon a swing arm 171 for rotation therewith. The swing arm 171 has a pair of spaced arms 172 having engaging grooves 173, respectively, in which the arms 144 of the slide piece 142 are received via sliders 174. When the slide piece 142 is moved on the screw shaft 121, the swing arm 171 is angularly moved to turn the output shaft 122.

The output shaft 122 has one end projecting out of the case 115. A collar 177 is splined to the projecting end of the output shaft 122 with a washer 176 held axially between the collar 177 and an intermediate portion of the output shaft 122. The collar 177 is fixed to the output shaft 122 by means of a washer 178 and a nut 179. A cable disc 182 is rotatably fitted over the collar 177. A bracket 203 secured to the cross bar 106 is welded to the collar 177.

Figure 10:
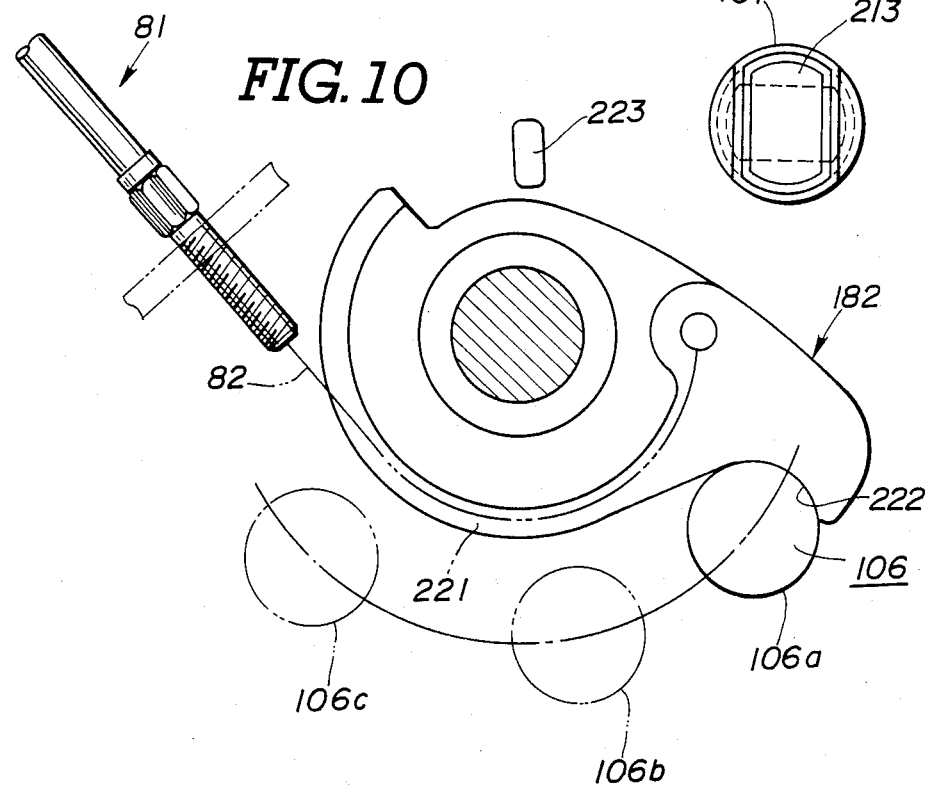
FIG. 10 is a side elevational view of a cable disc.

As shown in FIG. 10, the cable disc 182 has a groove 221 for winding the cable inner member 82 and an engaging surface 222 for engaging the cross bar 106. The cross bar 106 will be positioned at 106a, 106b, 106c when the stand 11 is stored, contacts the ground, and is lifted up, respectively. The cable disc 182 will engage a stopper 223 projecting from the case 115 when the stand 11 contacts the ground.

The motor 114 is controlled for its operation by three switches 301, 302, 303 (FIGS. 3 and 6).

As shown in FIGS. 6, 11, and 13, the switch 301 is disposed behind the guide member 151. The switch 301 has fixed contacts 311, 312 on the opposite ends of the slide groove 153 and can be turned on and off by contact of the fixed contacts 311, 312 with a movable contact 313 attached to the end of one of the arms 144. The movable contact 313 is guided in its movement by a guide member 314 (FIG. 12). The switch 301 is turned on when the arm 144 is positioned at 144a at the time the stand 11 is in the stored position, and also when the arm 144 is positioned at 144b at the time the stand 11 is in the lifted position. The switch 301 is turned off when the arm 144 is located between the positions 144a, 144b.

The switch 302 is positioned so that it will be turned on and off dependent on angular movement of the swing arm 171. As shown in FIGS. 6 and 11, a guide member 322 having an arcuate slide groove 321 is disposed below the guide member 151. The switch 302 is located at one end of the guide member 322 and has a fixed contact 323 of a prescribed length positioned closely to one end of the slide groove 321. The switch 302 also has a movable contact 324 slidably fitted in the guide member 322. A shank 325 projecting from the slide groove 321 engages in a slot 326 in the swing arm 171. The switch 302 is turned off while the shank 325 is located between a position 325a when the stand 11 is in the stored position, and a position 325b when the slide piece 142 and the swing arm 171 are engageable with each other and disengageable from each other. The switch 302 is turned on while the shank 325 is located between the position 325b and a position 325c when the stand 11 is in the lifted position.

The switch 303 is disposed between the control lever 13 and the bracket 22. As shown in FIGS. 3 and 4, a guide member 332 having an arcuate slide groove 331 is disposed near the free end of the proximal portion 32. The switch 303 is located at one end of the guide member 332 and has a fixed contact 333 of a prescribed length positioned close to one end of the slide groove 331. The switch 302 also has a movable contact 334 slidably fitted in the guide member 332. A shank 335 projecting from the slide groove 331 engages in a hole 336 in the proximal portion 32. The switch 303 is turned off while the shank 335 is located between a position 335a when the stand 11 is in the stored position, and a position 335b when the stand 11 contacts the ground. The switch 303 is turned on while the shank 335 located between the position 335b and a position 335c when the stand 11 is in the lifted position.

Figure 14:
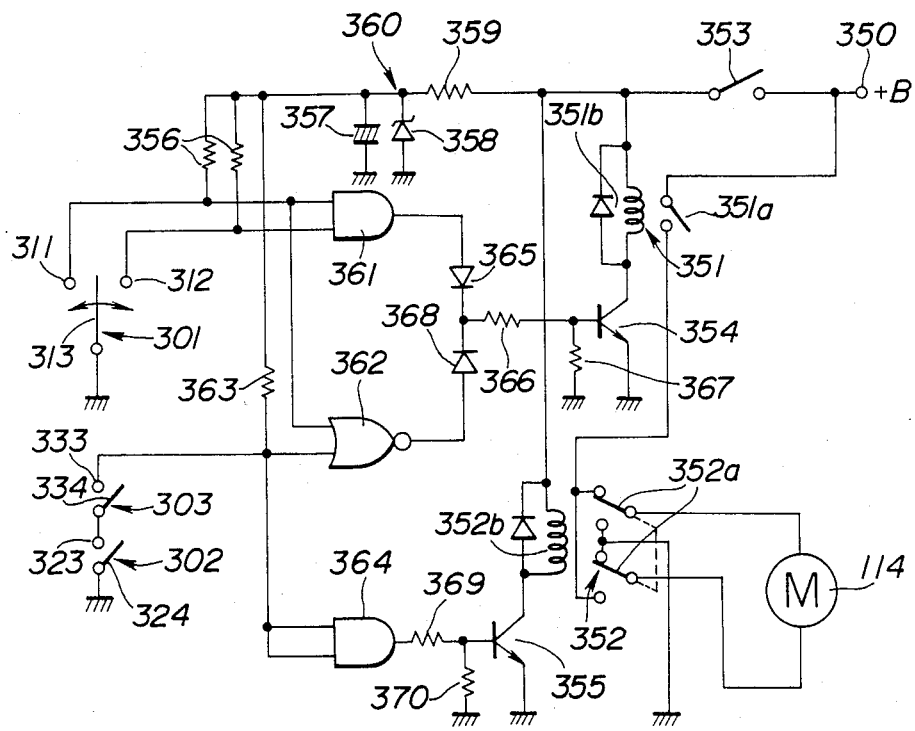
FIG. 14 is a circuit diagram of a control circuit.

A control circuit will be described with reference to FIG. 14. The control circuit has a terminal 350 connected to the positive terminal of a power supply (not shown). The motor 114 is connected between the terminal 350 and ground through a relay switch 351a of a first relay 351 and a second relay 352a of a relay switch 352, the motor 114 being connected in series with the relay switches 351a, 352a. The relay switch 352a serves to control the motor 114 to rotate either clockwise or counterclockwise. A power supply switch 353 is connected to the terminal 350. Between the downstream terminal of the power supply switch 353 and ground, there are connected, parallel to each other, a circuit comprising a relay coil 351b of the first relay 351 and the collector and emitter of a transistor 354 connected in series with the relay coil 351b, and a circuit comprising a relay coil 352b of the second relay 352 and the collector and emitter of a transistor 355 connected in series with the relay coil 352b.

The switch 301 has its movable contact 313 grounded and its fixed contacts 311, 312 connected to the downstream terminal of the power supply switch 353 through a constant-voltage circuit 360 composed of resistors 356, a capacitor 357, a zener diode 358, and a resistor 359. The fixed contact 311 is also connected to input terminals of an AND gate 361 and a NOR gate 362. The fixed contact 312 is connected to the other input terminal of the AND gate 361. The switches 302, 303 are connected in series with each other. The fixed contact 333 of the switch 303 is connected via a resistor 363 to the output terminal of the constant-voltage circuit 360, and is also connected to the other input terminal of the NOR gate 362 and both input terminals of an AND gate 364. The movable contact 324 of the switch 302 is connected to ground.

An output signal from the AND gate 361 is applied through a diode 365 and resistors 366, 367 to the base of the transistor 354. An output signal from the NOR gate 362 is applied through a diode 368 and the resistors 366, 367 to the base of the transistor 354. An output signal from the AND gate 364 is applied through resistors 369, 370 to the base of the transistor 355.

Figure 16:
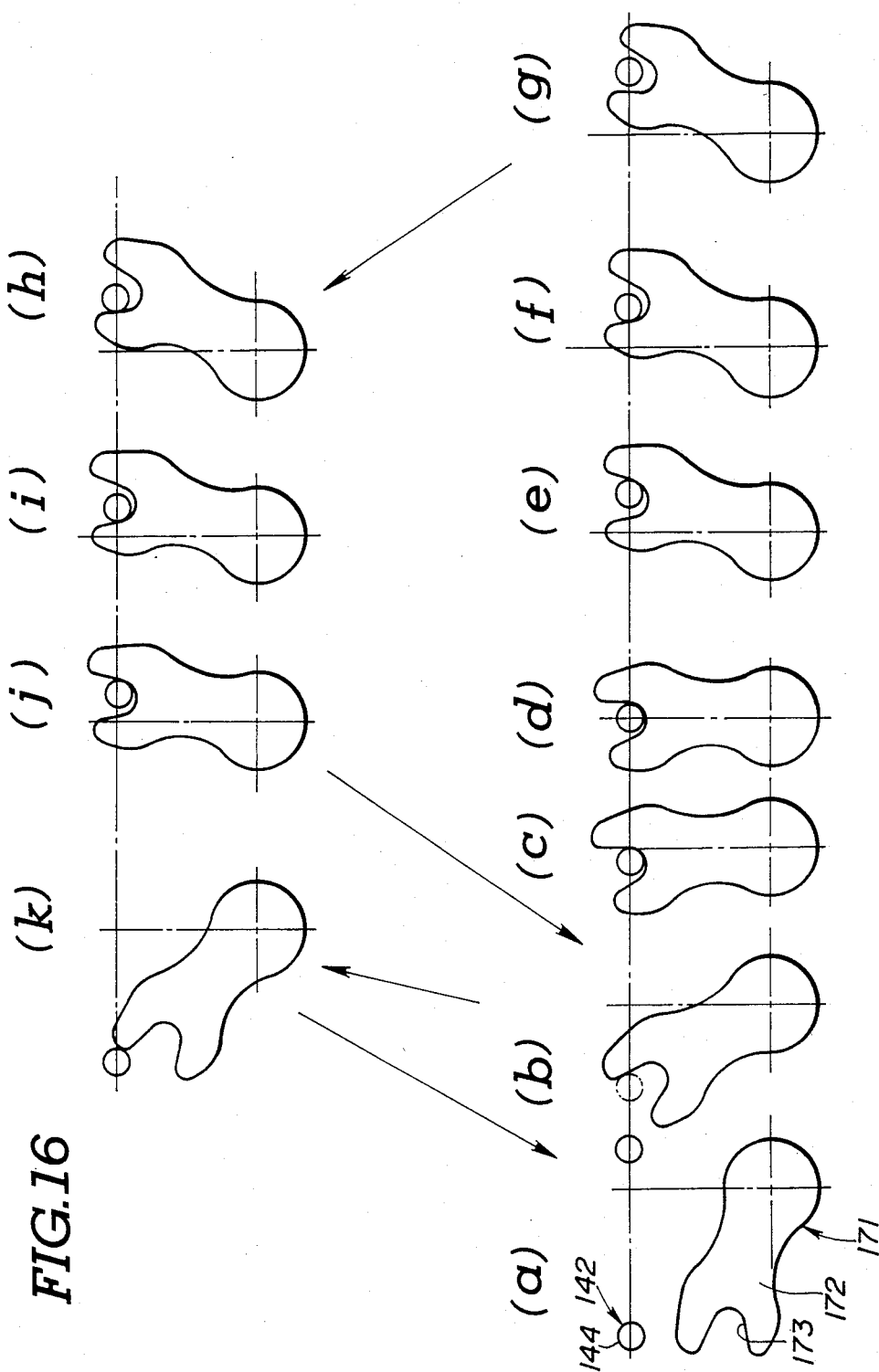
FIG. 16 is a diagram showing the relationship between a slide piece and a swing arm.

The control circuit of the aforesaid construction will operate the motor 114 based on the combinations of on- and off-states of the switches 301, 302, and 303. The modes of operation are indicated in the table of FIG. 15, and the relationship between the slide piece 142 and the swing arm 171 is illustrated in FIG. 16. Operation of the control circuit will be described below with reference to FIGS. 15 and 16. It is assumed that the power supply switch 353 is turned on.

After the motorcycle 1 has run and before it is lifted up on the stand 11, the motorcycle 1 is stopped and the stand 11 is in its stored position. At this time, the switches 302, 303 are turned off and the switch 301 is turned on with the movable contact 313 contacting the fixed contact 311. Therefore, the output signal from the AND gate 361 is "0", the output signal from the NOR gate 362 is "0", and the output signal from the AND gate 364 is "1". Therefore, the transistor 354 is de-energized to turn off the relay switch 351a, and the transistor 355 is energized to actuate the relay switch 352 in the reverse position as shown in FIG. 14. The motor 114 is not operated.

By turning the control lever 13 upwardly, the stand 11 is manually moved downwardly to the ground-contacting position. At this time, the roller 36 is moved from the position 36a to the position 36b (FIG. 2) to cause the operative surface 91 to pull up the cable 81. Subsequent upward movement of the control lever 13 causes the roller 36 to be guided by the arcuate surface 92 and fails to pull up the cable 81. As shown in FIG. 10, the cable disc 182 is caused by the cable 81 to move the cross bar 106 from the position 106a to the position 106b. With the stand 11 in the ground-contacting position, the cable disc 182 abuts against the stopper 223. Any subsequent excessive movement of the control lever 13 is absorbed by the cancel spring 71 as it expands. FIG. 16(a) shows the relationship between the arms 144 of the slide piece 142 and the swing arm 171 when the stand 11 is in the stored position. On swinging movement of the cross bar 106 caused by the cable disc 182, the swing arm 171 is angularly moved to a position in which it can engage with or disengage from the arms 144. The stand 11 contacts the ground under this condition.

When the switch 303 is turned on by the operation of the control lever 13 at the time the stand 11 contacts the ground, the switches 302, 303 are turned on and the switch 301 remains on. Therefore, output signal of the NOR gate 362 becomes "1" to energize the transistor 354 to turn on the relay switch 351a. At the same time, the output signal from the AND gate 364 becomes "0" to de-energize the transistor 355 to actuate the relay switch 352a into the normal position. The motor 114 is now caused to rotate in the normal direction. The slide piece 142 is then moved to cause the arms 144 to engage the swing arm 171 as indicated by the imaginary line in FIG. 16(b). The arms 144 angularly move the swing arm 171 progressively as shown in FIGS. 16(b) through 16(f) to bring the stand 11 into the standing position. The motorcycle 1 is completely lifted by the stand 11 in the position of FIG. 16(g) with the front wheel 2 lifted off the ground.

When the lifting movement of the motorcycle 1 is to be interrupted, the control lever 13 is allowed to return to its starting position. Since the switch 303 is turned off and the switch 301 remains off, the output signal of the AND gate 361 becomes "1" and the output signal of the AND gate 364 becomes "1". The relay switch 351a remains on and the relay switch 352a is brought into the reverse position. The motor 114 is then rotated in the reverse direction until the stand 11 reaches the ground-contacting position, and then the stand 11 can be lifted back into the stored position.

When the lifting of the motorcycle 1 is completed, the switches 302, 303 are turned on and the switch 301 is also turned on with the movable contact 313 connected to the fixed contact 312. Therefore, the output signal of the AND gate 361 becomes "0" to turn off the transistor 354 and the relay switch 351a, thus stopping the normal rotation of the motor 114.

Operation to lower the motorcycle 1 will now be described below. When the control lever 13 is turned downwardly, the switch 303 is turned off to cause the output signals of the NOR gate 362 and the AND gate 364 to become "1". The relay switch 351a is turned on and the relay switch 352a is actuated into the reverse position to enable the motor 114 to rotate in the reverse direction. As the motor 114 is reversed, the slide piece 142 is moved to turn the swing arm 171 successively through the positions of FIGS. 16(g) through 16(f) to the position of FIG. 16(b). The stand 11 is returned to the ground-contacting position, and the swing arm 171 is returned to the position in which it can engage with or disengage from the arms 144. Therefore, the stand 11 is angularly moved to slowly lower the motorcycle 1 while the stand 11 is controlled by the slide piece 142 until the front wheel 4 descends into contact with the ground.

When the motorcycle 1 is completely lowered, the switch 301 is turned on with the movable contact 313 connected to the fixed contact 311 to cause the output signal of the AND gate 361 to become "0". The relay switch 351a is turned off to stop the reverse rotation of the motor 114. The arms 144 of the slide piece 142 are stopped away from the swing arm 171 as shown in FIGS. 16(a) and 16(b). If the control lever 13 is turned upwardly again while the motorcycle 1 is being lowered, the switch 303 is turned on with the switches 302, 301 remaining off. Therefore, the output signal from the ANd gate 364 becomes "0" to operate the relay switch 352a into the normal position to rotate the motor 114 in the normal direction. The lowering movement of the motorcycle 1 is therefore cancelled.

After the motor 114 has been de-energized with the stand 11 in the ground-contacting position, the stand 11 springs up under the force of return spring 12 and the weight of the motorcycle 1. Consequently, the switch 301 is turned on and the switches 302, 303 are turned off.

With the above embodiment of the present invention, the stand 11 can be manually be operated quickly by the control lever while it can be brought into contact with the ground with a small force. Then, the stand 11 can be brought into the standing position by the motor 114 in those situations where the stand 11 requires a large force for its standing movement after it has contacted the ground. Switching between the manual operation and the motor-driven operation for moving the stand 11 is carried out by engagement and disengagement between the slide piece 142 and the swing arm 171. Therefore, the power-driven stand device of the invention can be made by a reduced number of parts and in a compact arrangement.

Figure 8:
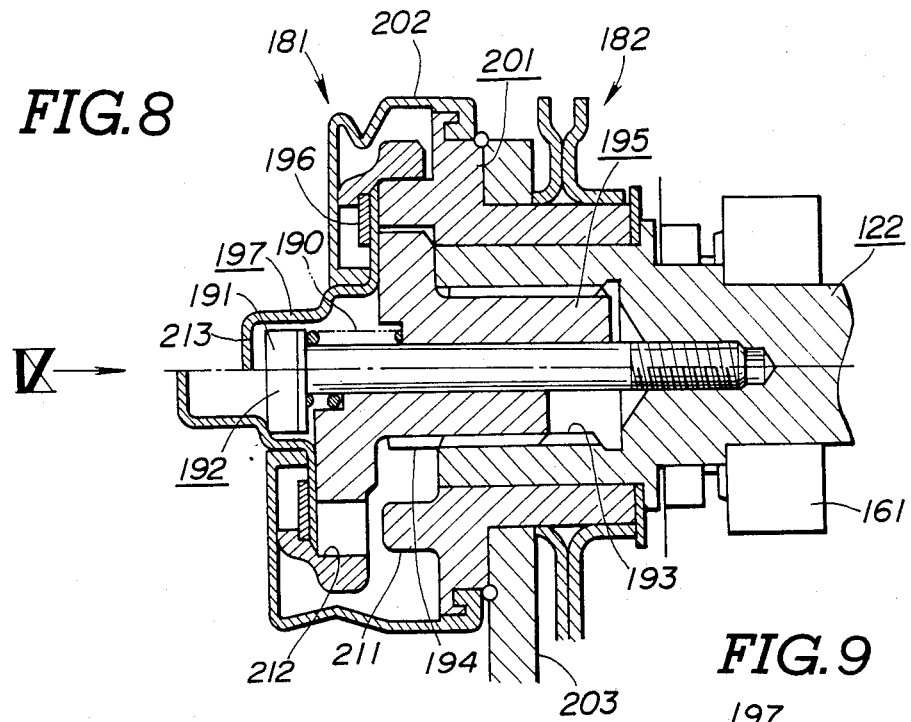
FIG. 8 is a cross-sectional view of a clutch in a power-driven stand device according to another embodiment of the invention.
Figure 9:
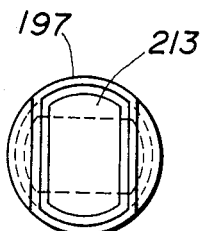
FIG. 9 is an elevational view as seen in the direction of arrow IX in FIG. 8.

The cable disc 182 may be mounted on the end of the output shaft 122 projecting from the case 115 by means of a clutch mechanism 181 according to another embodiment shown in FIGS. 8 and 9. The clutch mechanism 181 has a setscrew 192 having a rectangular head 191 and fixed coaxially to the output shaft 122; a clutch 195 engaging the output shaft 122 through teeth 193, 194 such that it is concurrently rotatable with the output shaft 122 and slidable along the output shaft 122; the clutch 195 being normally urged by a spring 190 in a direction away from the setscrew head 191; a clutch plate 197 rotatably mounted on the clutch 195 by a retaining ring 196; a clutch collar 201 rotatably fitted over the end of the output shaft 122 and over which the cable disc 182 is loosely fitted; and an extensible boot 202 secured to the clutch collar 201. The bracket 203 fixed to the cross bar 106 is secured to the clutch collar 201.

The clutch collar 201 has projections 211 engageable respectively in recesses 212 defined in the clutch 195 for connecting the clutch mechanism 181. More specifically, the projections 211 engage in the recesses 212 under normal condition as shown in the upper half of FIG. 8. In this position, the setscrew head 191 is positioned in a rectangular portion 213 of the clutch plate 197. Therefore, the rotative force of the output shaft 122 is transmitted through the teeth 193, 194, the recesses 212, the projections 211, the clutch collar 201, and the bracket 203 to the stand 11 to turn the stand 11.

When the stand 11 is to be manually operated (e.g.,) upon a failure of the motor 114), the clutch plate 197 is manually rotated to bring the rectangular portion 213 out of engagement with the setscrew head 191. The projections 212 are now disengaged from the recesses 211, and hence the bracket 203 joined to the stand 11 is disconnected from the output shaft 122, as shown in the lower half of FIG. 8.

The stand device of the present invention is constructed of a reduced number of parts and is of a compact structure. The stand can be manually operated in those situations where it can be moved with a small force, and can be in those situations where operated by the motor while a large force is needed to move the stand.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A power-driven stand device in a motorcycle, comprising:
   a frame;
   a stand angularly movably mounted on said frame, said stand being manually movable in a relatively light load range thereof;

a drive source for moving said stand in a relatively heavy load range thereof;
a control member for remotely controlling said stand;
first detecting means associated with said control member for detecting the control member in a prescribed position;
second detecting means associated with said stand for detecting the stand substantially in contact with the ground; and
control means for controlling said drive source to operate said stand in response to combinations of outputs of said first and second detecting means.

2. A power-driven stand device in a motorcycle comprising:
a frame;
a stand angularly movable in a relatively light load range thereof;
a drive source for moving said stand in a relatively heavy load range thereof;
a control member for remotely controlling said stand;
first detecting means associated with said control member for detecting the control member in a prescribed position;
second detecting means associated with said stand for detecting the stand substantially in contact with the ground;
control means for controlling said drive source to operate said stand in response to combinations of outputs of said first and second detecting means; and
a mechanism for operating said second detecting means, said mechanism comprising a slide member movable along a first path in response to operation of said drive source, and a swing arm angularly movable with said stand along a second path partly overlapping said first path and locatable in a position in which it can engage with and disengage from slide member when said stand is substantially in contact with the ground.

3. A power-driven stand device according to claim 1, wherein:
said control means controls said drive source to operate said stand so that it can be manually operated while it is not brought into contact with the ground, and so that it can be brought into the standing position by said drive source after it has contacted the ground.

4. A power-driven stand device according to claim 1, wherein:
said control member has an angular range of its movement which is substantially equal to that of said stand.

* * * * *